United States Patent [19]

Hasegawa

[11] Patent Number: 4,874,232

[45] Date of Patent: Oct. 17, 1989

[54] IMAGING OPTICAL SYSTEM

[75] Inventor: Akira Hasegawa, Tokyo, Japan

[73] Assignee: Olympus Optical Co., Ltd., Tokyo, Japan

[21] Appl. No.: 269,453

[22] Filed: Nov. 10, 1988

[30] Foreign Application Priority Data

Nov. 13, 1987 [JP] Japan .................. 62-285454

[51] Int. Cl.⁴ .................. G02B 15/14; G02B 9/60
[52] U.S. Cl. .................. 350/427; 350/449
[58] Field of Search .................. 350/427, 423, 426, 449, 350/450

[56] References Cited

U.S. PATENT DOCUMENTS 3,477,776 11/1969 Price .................. 350/427
3,937,562 2/1976 Muszumanski et al. .
4,063,800 12/1977 Iizuka et al. .

Primary Examiner—Bruce Y. Arnold
Assistant Examiner—Rebecca D. Gass
Attorney, Agent, or Firm—Cushman, Darby & Cushman

[57] ABSTRACT

An imaging optical system to be used in combination with fiberscopes, etc. comprising a first lens unit having positive refractive power and the function of a compensator, a second lens unit having negative refractive power and the function of a variator, a third lens unit having positive refractive power and the function of an imaging lens, and a stop arranged before the first lens unit, said imaging optical system being so adapted as to provide bright images at an optimum magnification and permit photographing images within the same magnification range on image pick-up devices having any image sizes.

4 Claims, 10 Drawing Sheets

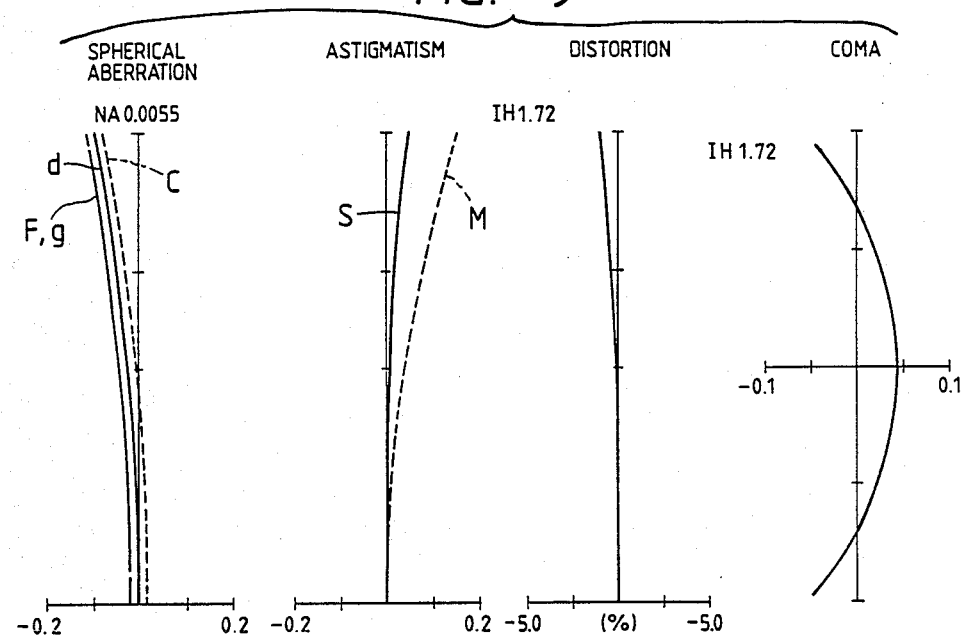
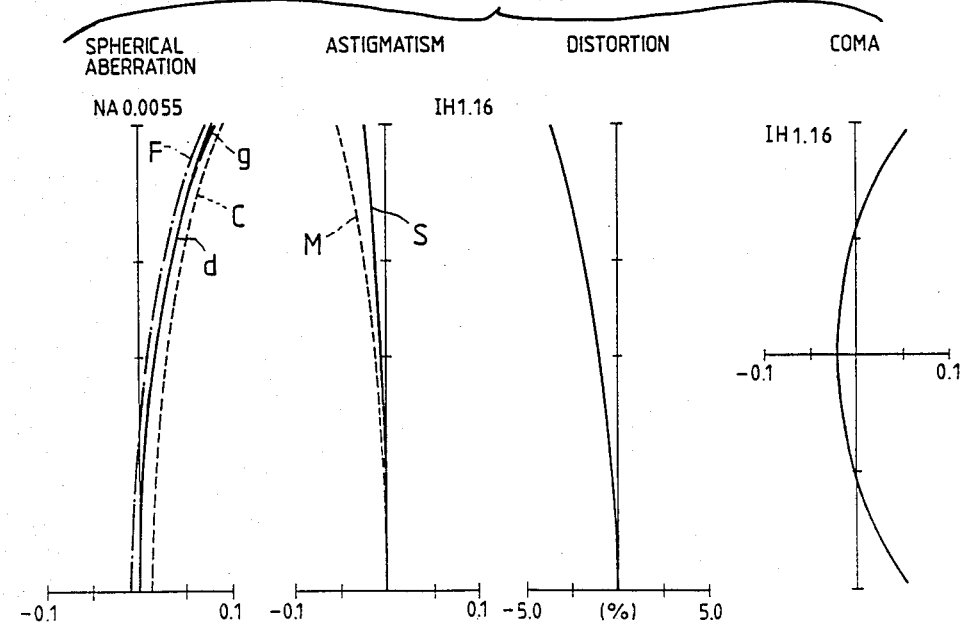

IMAGING OPTICAL SYSTEM

BACKGROUND OF THE INVENTION (a) Field of the Invention

The present invention relates to an imaging optical system which can be zoomed and is to be attached to an eyepiece of fiberscopes or non-flexible endoscopes for focusing images on image pick-up devices of a monitor.

(b) Description of the Prior Art

Composition of an instrument used for observing interiors of coeloms, machines, etc. on a TV monitor is illustrated in FIG. 1 wherein the reference numeral 1 represents a fiberscope which accommodates an observation optical system consisting of an objective lens 2, an image guide 3, an eyepiece lens 4, etc., and an illumination optical system consisting of a light source 5, a light guide 6, etc., and is used for observing objects through the observation optical system while illuminating the objects with the illumination optical system. In order to observe an image formed by the observation optical system of the fiberscope, an adapter lens 7 is arranged after the eyepiece lens 4 so that an image is formed on an image pick-up device 8 by the adapter lens and projected onto a TV set for observation.

Since diameters of the image guides and magnifications of the eyepiece lenses are different depending on types of fiberscopes used, the optical system for focusing images obtained with a fiberscope onto an image pick-up device by using an adapter lens and projecting the images on a monitor provides images of different sizes on the TV monitor 10.

In case of the ordinary TV signals of NTSC type, it is adequate to observe images from a distance 5 to 6 times as long as the vertical side of the TV monitor. Accordingly, images are not clearly observable when images are too small on the monitor. When images are too large on the monitor, in contrast, the images formed on an image guide are projected only partially on the monitor.

For the reason described above, it has conventionally been necessary to prepare a multiple number of adapter lenses having fixed and different magnifications, and exchange the adapter lenses so as to obtain images of adequate sizes on the monitor, thereby posing a problem of inconvenience.

Further, brightness for photographing (F number) is determined by a aperture stop for the eyepiece lens 4 in the fiberscope 1. Therefore, the F number is enlarged and images are darkened when an adapter lens having a high magnification is used. Accordingly, it is impossible to observe an object located at a long distance in such a case. In order to observe an object located at a long distance, it is necessary to use an adapter lens having a low magnification for brightening its image while sacrificing image size and convenience.

In order to solve the problems described above, it is strongly demanded to use a zoom lens system as the adapter lens. However, since image pick-up devices are prepared in multiple types having different image sizes of ½ inch, ⅔ inch, etc., sizes of images projected on a TV monitor are different depending on image sizes of image pick-up devices used even when images obtained with the same fiber scope are formed at the same magnification on the image pick-up devices. Accordingly, variation range of image size projected on the monitor is not uniformalized due to the variation of image sizes of the image pick-up devices and images may not be observed at adequate sizes even when a zoom lens system is used as the adapter lens.

In order to allow to use image pick-up devices having various image sizes and to project images formed with fiber bundles having various diameters onto the monitor at an adequate size, it is necessary to use an adapter lens having a high zooming ratio. When a zoom lens system used as the adapter lens has a high zooming ratio, however, the zoom lens system has undesirably large total length.

In the recent years, most image pick-up devices are of two types having image sizes of ⅔ inch and ½ inch, and image pick-up devices of ½ inch are mainly used taking the compactness thereof into consideration. Since performance such as resolution and brightness of image pick-up devices is improved, image pick-up devices of ½ inch are satisfactory in performance thereof. In view of the fact that the imaging optical system is used in various ways, it is necessary to adopt an adapter lens compatible with image pick-up devices of any image sizes.

Furthermore, when CCD or the similar element is used as the image pick-up device, it is necessary to arrange an optical low pass filter consisting of a birefringent plate such as crystal before the CCD, and the adapter lens must have a long back focal length.

SUMMARY OF THE INVENTION

A primary object of the present invention is to provide an imaging optical system for focusing images obtained with various types of fiberscopes, non-flexible endoscopes, etc. onto solid-state image pick-up devices, said imaging optical system being capable of projecting images of adequate sizes and brightness onto a TV monitor regardless of types of endoscopes and image sizes of image pick-up devices.

The imaging optical system according to the present invention has the composition shown in FIG. 2 wherein a stop arranged on the eyepiece of a fiberscope (the exit pupil corresponds to the stop S in case of a non-flexible endoscope) functions as a aperture stop. The imaging optical system comprises the stop S, a first lens unit $L_1$ having the function of a compensator and positive refractive power, a second lens unit $L_2$ having the function of a variator and negative refractive power, and a third lens unit $L_3$ functioning as an imaging lens and having positive refractive power which are sequentially arranged from the object side. Further, the imaging optical system according to the present invention is so designed as to satisfy the following conditions (1), (2) and (3):

(1) $1.4 > \beta_1/\beta_{ST} > 0.71$
(2) $f_W \leq f_1 \leq f_T$
(3) $2 < f_W/f_3 < 3.2$ wherein the reference symbol $f_1$ represents focal length of the first lens unit $L_1$, the reference symbol $f_3$ designates focal length of the third lens unit $L_3$, the reference symbol $f_W$ denotes focal length of the optical system as a whole at the wide position thereof, the reference symbol $f_T$ represents focal length of the optical system as a whole at the tele position thereof, the reference symbol $\beta_1$ designates magnification of the first lens unit $L_1$ and the reference symbol $\beta_{ST}$ denotes magnification of the optical system as a whole at an intermediate focal length thereof.

The condition (1) is adopted for shortening total length of the lens system. This condition is required to make as short as possible the conjugate distances (between the object points and the image points) of the second lens unit $L_2$ and the third lens unit $L_3$ especctively.

In FIG. 4, the distance $IO=l+l'$ as measured from the object point O to the image point I of the lens L is expressed by the following formula (i):

$$IO=l+l'=f_L(2+|\beta_L|+1/|\beta_L|) \qquad (i)$$

wherein the reference symbol $f_L$ represents focal length of the lens L and the reference symbol $\beta_L$ designates magnification of the lens L. In order to obtain the minimum absolute value of the formula (i), $\beta_L$ must clearly be $\pm 1$. Accordingly, total length of the lens system can be shortened when each of the lens units has an imaging magnification in the vicinity of x1. It is therefore preferable to design magnification $\beta_L$ of the third lens unit $L_3$ so that $|\beta_3|$ is nearly equal to 1.

This concept is applicable also to the second lens unit $L_2$ as described below. FIG. 5 shows a graph visualizing relationship of magnification versus distance IO between the object point and image point of the second lens unit $L_2$. When zooming ratio of the lens system is represented by z, this graph clarifies that the distance IO is the minimum and shifting distance of the second lens unit is short when magnification of the second lens unit $L_2$ is designed so as to obtains $\beta_{2W}=-1/\sqrt{z}$ and $\beta_{2T}=-\sqrt{z}$ around $-1$. The reference symbols $\beta_{2W}$ and $\beta_{2T}$ represent magnifications of the second lens unit $L_2$ at the wide position and the tele position respectively. Accordingly, the magnification $\beta_2$ of the second lens unit $L_2$ should be designed so that $|\beta_2|$ has a value in the vicinity of 1 at intermediate focal length of the lens system as a whole.

When magnification of the lens system as a whole is represented by $\beta$ and magnification of the first lens unit $L_1$ is designated by $\beta_1$, $\beta_{ST}$ is nearly equal to $\beta_1$, i.e., $\beta_1/\beta_{ST}$ is nearly equal to 1 since $\beta$ is equal to $\beta_1 \times \beta_2 \times \beta_3$. If the condition (1) is not satisfied, $\beta_2$ and $\beta_3$ largely deviate from the vicinity of x1, thereby prolonging total length of the lens system and making it impossible to make the lens system compact.

Since the imaging optical system according to the present invention receives the light emitted from the eyepiece of endoscopes, it can be considered that an object to be observed is located at a long distance. In this case, taking $\beta_1=\beta_{ST}$ defined by the condition (1) into consideration, focal length $f_1$ of the first lens unit $L_1$ is nearly equal to $f_{ST}$. Accordingly, $f_1$ satisfies the condition (2).

If $f_1$ is smaller than $f_W$ in the condition (2), it will be impossible to reserve a sufficiently long back focal length. Further, it will be impossible to reserve a long shifting distance for the second lens unit $L_2$ or a sufficiently broad zooming range. If $f_1$ is larger than $f_T$, in contrast, the object point of the first lens unit $L_1$ is located too far, thereby widening the airspace between the first lens unit $L_1$ and the second lens unit $L_2$, and making total length of the lens system too long for convenient handling.

In an imaging optical system for television, it is necessary to reserve a long back focal length in the optical system since an infrared cut filter and an optical low pass filter such as a crystal are arranged before an image pick-up device. Therefore, a great inconvenience is produced if the lower limit of the condition (2) is exceeded. Further, in order to prolong back focal length, it is an effective means to shift the principal point of the lens system rearward and prolong total length of the lens system to a certain degree. However, total length of the lens system will undesirably be too long when the upper limit of the condition (2) is exceeded.

The condition (3) defines back focal length of the lens system. In order to prevent variations of aberrations from being produced due to variation of height of light caused by zooming, it is desirable to design the third lens unit $L_3$ so as to have a symmetrical composition. Further, it is preferable to arrange the third lens unit $L_3$ aplanatically with regard to the object point of the second lens unit $L_2$, i.e., the image point of the third lens unit $L_3$, and the image point of the third lens unit $L_3$, and select value of $\beta_2$ in the vicinity of $-1$ to shorten total length of the lens system. Therefore, back focal length of the third lens unit $L_3$ is determined by focal length of the third lens unit $L_3$. In addition, height of ray at the third lens unit $L_3$ is the maximum at the wide position.

If $f_W/f_3$ exceeds 3.2 in the condition (3), back focal length will become too short to reserve a space for arranging a filter, etc. before the CCD. When the third lens unit $L_3$ has strong power, the upper ray is strongly refracted at the wide position and the longitudinal aberrations cannot be corrected. Further, the airspace reserved between the second lens unit $L_2$ and the third lens unit $L_3$ becomes too narrow to reserve the shifting distance for the second lens unit $L_2$ for zooming. Since the lens system according to the present invention is a zoom lens system comprising the three lens units and a stop arranged therebefore longitudinal coma of the upper ray can be corrected in the positive direction by both the concave surfaces of the second lens unit $L_1$, and the cemented surface and the concave surface located thereafter in the third lens unit $L_3$. It is therefore impossible to correct coma in the positive direction when power of the third lens unit $L_3$ is strengthened. Further, if $f_W/f_3$ has a value smaller than 2 defined as the lower limit of the condition (3), height of ray at the third lens unit $L_3$ is enhanced, diameter of the third lens unit $L_3$ is enlarged, and distance between the object point and the image point of the third lens unit $L_3$ is prolonged, thereby making it not easy to handle the zoom lens system.

Furthermore, it is desirable that the imaging optical system according to the present invention satisfies the following conditions (4) and (5):

(4) $|d/f_2|<0.45$ (5) $\nu_2>40$ wherein the reference symbol $f_2$ represents focal length of the second lens unit $L_1$, the reference symbol d designates shifting distance of the second lens unit $L_2$ and the reference symbol $\nu_2$ denotes Abbe's number of the negative lens component arranged in the second lens unit $L_1$.

The condition (4) defines shifting distance and focal length of the second lens unit $L_1$.

Since height of ray is varied by zooming, aberrations are varied by zooming. If the condition (4) is not satisfied, aberrations will be varied too remarkably to be corrected sufficiently favorably. Further, the maximum height of ray at the third lens unit $L_3$ is enhanced at the wide position, thereby obliging to enlarge the third lens unit $L_3$.

The condition (5) defines dispersive power of the negative lens component arranged in the second lens unit $L_2$ when the focal length of the second lens unit $L_2$ is defined within the range of the condition (4). Since height of the principal ray incident on the second lens unit $L_2$ is varied as the second lens unit $L_2$ is shifted for zooming, chromatic aberration is varied by zooming. The condition (5) is required for limiting variation of the lateral chromatic aberration produced by the second lens unit $L_2$ within a practically permissible range when the focal length of the second lens unit $L_2$ is defined so as to satisfy the condition (4). If the condition (5) is not satisfied, the lateral chromatic aberration will be varied remarkably.

In order to keep image size unchanged on a monitor regardless of exchange of an image pick-up device with another having a different image size when images of an object are formed on image pick-up devices by using the imaging optical system according to the present invention, the following methods can be adopted.

One method is to replace the third lens unit $L_3$ with a different third lens unit $L_3'$ in the optical system according to the present invention. Another method is to design the third lens unit $L_3$ as a vari-focal lens system.

In the case where either of the above-described methods is adopted, magnification $\beta_3'$ varied by the exchange or variation of magnification should desirably be within the range defined by the following condition (6):

(6) $1.4 > |\beta_3'| > 0.71$

FIG. 6A, FIG. 6B, FIG. 6C and FIG. 6D show diagrams illustrating formation of images on image pick-up devices having different image sizes while changing magnifications of the third lens unit $L_3$ in the imaging optical system. Out of these drawings, FIG. 6A and FIG. 6B show cases where images are formed on an image pick-up device having an image size of ½ inch, whereas FIG. 6C and FIG. 6D illustrate cases where images are formed on an image pick-up device having a larger image size of ⅔ inch by using the third lens unit $L_3'$ in the imaging optical system.

When magnifications of the first lens unit $L_1$, the second lens unit $L_2$ and the third lens unit $L_3$ and the third lens unit $L_3'$ are represented by $\beta_1$, $\beta_2$, $\beta_3$ and $\beta_3'$ respectively, magnifications of the second lens unit $L_2$ at the wide position and the tele position are designated by $\beta_{2W}$ and $\beta_{2T}$ respectively, and total magnifications of the imaging optical systems shown in FIG. 6A, FIG. 6B, FIG. 6C and FIG. 6D are denoted by $\beta_A$, $\beta_B$, $\beta_C$ and $\beta_D$ respectively, the following relations are obtained:

$$\left. \begin{array}{l} \beta_A = \beta_1 \times \beta_{2W} \times \beta_3 \\ \beta_B = \beta_1 \times \beta_{2T} \times \beta_3 \\ \beta_C = \beta_1 \times \beta_{2W} \times \beta_3' \\ \beta_D = \beta_1 \times \beta_{2T} \times \beta_3' \end{array} \right\} \quad \text{(ii)}$$

Let us represent length of the image pick-up device having the image size of ½ inch by a and designate length of the image pick-up device having the image size of ⅔ inch by A. Since a is actually 6.4 and A is actually 8.8, a/A is nearly equal to 0.73. Let us further represent diameters of the images formed on the image pick-up devices with the imaging optical systems at the wide positions thereof shown in FIG. 6A and FIG. 6C by b and B respectively. Then, image sizes are the same on the monitor when b/a is equal to B/A. Hence, the following formula is obtained:

$$a/A = b/B \quad \text{(iii)}$$

From the formulas (ii) and (iii), the following relationship establishes:

$$\beta_A:\beta_C = \beta_3:\beta_3' = a:A = \beta_B:\beta_D \quad \text{(iv)}$$

In the examples shown in FIG. 6A through FIG. 6C, the locations of the images formed with the lens units $L_1$ and $L_2$ are so designed as to be always constant regardless of zooming, and the condition of $\beta_3:\beta_3' = a/A$ is satisfied by exchanging the third lens units $L_3$ and $L_3'$ with each other which are not shifted for zooming.

In order to design the lens system compact in this case, it is desirable that the distance IO between the object point and the image point is short. When the focal length of the lens L is represented by $f_L$ and the magnification of the lens L is designated by $\beta_L$ in FIG. 4, the distance IO $(l+l')$ is expressed as follows:

$$l+l' = f_L(2+\beta_L+1/\beta_L)$$

This formula has the minimum value when $\beta_L$ has a value of ±1. From the above-mentioned formula and the formula (vi), values of $\beta_3$ and $\beta_3'$ are determined as follows:

$$\beta_3 = \pm \sqrt{a/A} \quad \text{(v)}$$

$$\beta_3' = 1/\pm \sqrt{a/A} \quad \text{(vi)}$$

That is to say, it is sufficient, when image size is changed, to determine the ratio a/A of the image sizes, and calculate magnifications $\beta_3$ and $\beta_3'$ of the imaging lens units by the formulae (v) and (vi).

The imaging optical system according to the present invention has already satisfied the conditions (1) through (5). As is already described with reference to the condition (3), it is desirable that the third lens units $L_3$ and $L_3'$ to be replaced with each other have symmetrical compositions and magnifications in the vicinity of −1 in order to minimize variation of aberrations produced due to the variation of height of ray which in turn is caused by zooming.

When $|\beta_3'|$ has a value smaller than 0.71 in the above-mentioned condition (6), it is impossible to obtain the required minimum back focal length, thereby making it necessary to prolong the focal length $f_3'$ of the third lens unit $L_3'$. In such a case, the condition (3) will undesirably be unsatisfied. If $|\beta_3'|$ has a value larger than 1.4, in contrast, variation of aberrations in the lens system will be a product of variation of aberrations produced by the first lens unit and the second lens unit multiplied by the magnification of the third lens unit. Accordingly, it will be necessary to control aberrations produced by the first lens unit and the second lens unit to extremely low levels by increasing number of lens components arranged in these lens units.

BRIEF DESCRIPTION OF THE DRAWINGS

FIG. 7 through FIG. 9 show curves illustrating aberration characteristics of the Embodiment 1 of the present invention;

FIG. 10 through FIG. 12 show curves illustrating aberration characteristics of the Embodiment 2 of the present invention;

DETAILED DESCRIPTION OF THE PREFERRED EMBODIMENTS

Figure 1:
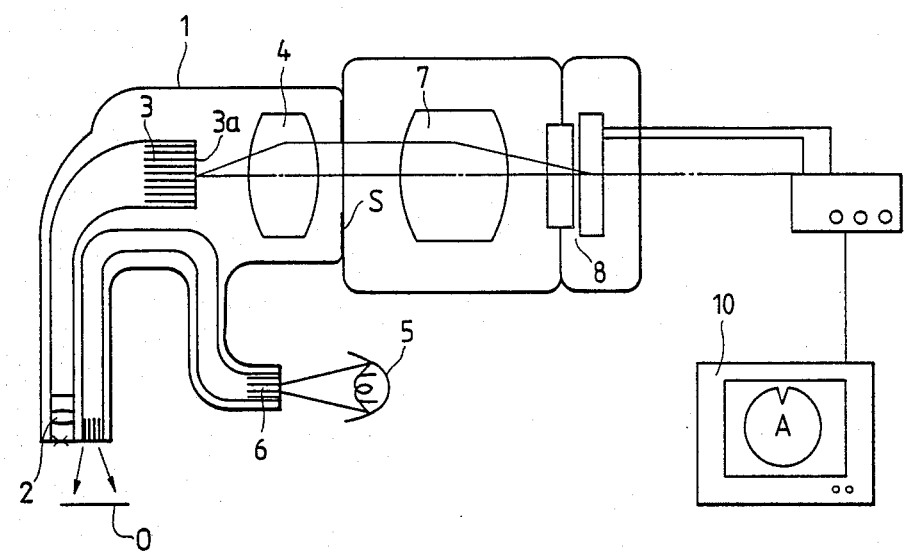
FIG. 1 shows a sectional view illustrating the composition of an image fiber instrument using an imaging optical system.

Now, the preferred embodiments of the imaging optical system according to the present invention will be detailedly described with reference to numerical data thereof.

Embodiment 1

$f = 10.0-15.45$,
Object point 273.4482   F/3.452,   Image height 1,2032

$r_1 = \infty$ (stop)
$d_1 = 0.1641$
$r_2 = \infty$
$d_2 = 0.5469$   $n_1 = 1.51633$   $\nu_1 = 64.15$
$r_3 = \infty$
$d_3 = 1.9141$
$r_4 = \infty$
$d_4 = 0.5469$   $n_2 = 1.51633$   $\nu_2 = 64.15$
$r_5 = \infty$
$d_5 = 1.7501$
$r_6 = \infty$
$d_6 = 4.9221$   $n_3 = 1.79952$   $\nu_3 = 42.24$
$r_7 = \infty$
$d_7 = D_1$ (variable)
$r_8 = 4.9390$
$d_8 = 1.6790$   $n_4 = 1.51633$   $\nu_4 = 64.15$
$r_9 = 13.8556$
$d_9 = D_2$ (variable)
$r_{10} = \infty$
$d_{10} = 4.0798$   $n_5 = 1.54869$   $\nu_5 = 45.55$
$r_{11} = \infty$
$d_{11} = 0.6563$
$r_{12} = -4.7137$
$d_{12} = 0.4375$   $n_6 = 1.88300$   $\nu_6 = 40.78$
$r_{13} = 9.2885$
$d_{13} = D_3$ (variable)
$r_{14} = \infty$
$d_{14} = 1.6407$   $n_7 = 1.69680$   $\nu_7 = 55.52$
$r_{15} = -5.5242$
$d_{15} = 0.1094$
$r_{16} = 16.6803$
$d_{16} = 1.3672$   $n_8 = 1.51633$   $\nu_8 = 64.15$
$r_{17} = -146.5059$
$d_{17} = 0.1094$
$r_{18} = 5.3787$
$d_{18} = 2.1876$   $n_9 = 1.69680$   $\nu_9 = 55.52$
$r_{19} = \infty$
$d_{19} = 0.5305$   $n_{10} = 1.84666$   $\nu_{10} = 23.78$
$r_{20} = 9.5165$ -continued $f = 10.0-15.45$,
Object point 273.4482   F/3.452,   Image height 1,2032

$d_{20} = 1.2032$
$r_{21} = \infty$
$d_{21} = 3.5548$   $n_{11} = 1.54869$   $\nu_{11} = 45.55$
$r_{22} = \infty$

| f | 10.0 | 12.32 | 15.45 |
|---|---|---|---|
| $D_1$ | 0.602 | 0.465 | 0.602 |
| $D_2$ | 0.547 | 1.307 | 1.936 |
| $D_3$ | 1.827 | 1.203 | 0.438 |

$f_1 = 13.969$, $f_2 = -3.490$, $f_3 = 4.336$
$\beta_1/\beta_{ST} = 0.04984/0.0462 = = 1.08$, $|d/f_2| = 0.40$
$f_W/f_3 = 2.31$, $\nu_2 = 40.78$, $\beta_3 = -0.93$

Embodiment 2

$f = 10.0-15.37$,
Object point 274.8763   F/3.449,   Image height 1.2095

$r_1 = \infty$ (stop)
$d_1 = 0.1649$
$r_2 = \infty$
$d_2 = 0.5498$   $n_1 = 1.51633$   $\nu_1 = 64.15$
$r_3 = \infty$
$d_3 = 1.9241$
$r_4 = \infty$
$d_4 = 0.5498$   $n_2 = 1.51633$   $\nu_2 = 64.15$
$r_5 = \infty$
$d_5 = 1.7592$
$r_6 = \infty$
$d_6 = 4.9478$   $n_3 = 1.79952$   $\nu_3 = 42.24$
$r_7 = \infty$
$d_7 = D_1$ (variable)
$r_8 = 4.9648$
$d_8 = 1.6877$   $n_4 = 1.51633$   $\nu_4 = 64.15$
$r_9 = 13.9280$
$d_9 = D_2$ (variable)
$r_{10} = \infty$
$d_{10} = 4.1012$   $n_5 = 1.54869$   $\nu_5 = 45.55$
$r_{11} = \infty$
$d_{11} = 0.6597$
$r_{12} = -4.7383$
$d_{12} = 0.4398$   $n_6 = 1.88300$   $\nu_6 = 40.78$
$r_{13} = 9.3370$
$d_{13} = D_3$ (variable)
$r_{14} = \infty$
$d_{14} = 1.7097$   $n_7 = 1.72916$   $\nu_7 = 54.68$
$r_{15} = -10.2677$
$d_{15} = 0.1100$
$r_{16} = 20.7735$
$d_{16} = 1.3744$   $n_8 = 1.72916$   $\nu_8 = 54.68$
$r_{17} = -12.0027$
$d_{17} = 0.1100$
$r_{18} = 6.5805$
$d_{18} = 1.6218$   $n_9 = 1.72916$   $\nu_9 = 54.68$
$r_{19} = -71.5316$
$d_{19} = 0.5333$   $n_{10} = 1.84666$   $\nu_{10} = 23.78$
$r_{20} = 12.2617$
$d_{20} = 1.0280$
$r_{21} = \infty$
$d_{21} = 5.7724$   $n_{11} = 1.54869$   $\nu_{11} l = 45.55$
$r_{22} = \infty$

| f | 10.0 | 12.30 | 15.37 |
|---|---|---|---|
| $D_1$ | 0.605 | 0.467 | 0.605 |
| $D_2$ | 0.550 | 1.314 | 1.946 |
| $D_3$ | 1.836 | 1.209 | 0.440 |

$f_1 = 14.041$, $f_2 = -3.508$, $f_3 = 4.564$
$\beta_1/\beta_{ST} = 0.04984/0.0462 = 1.08$, $|d/f_2| = 0.40$
$f_W/f_3 = 2.19$, $\nu_2 = 40.78$, $\beta_3 = -0.93$

Embodiment 3 f = 10.0–15.967,
Object point 202.5932   F/4.5,   Image height 1.1345

| | | | |
|---|---|---|---|
| $r_1 = \infty$ (stop) | | | |
| | $d_1 = D_1$ (variable) | | |
| $r_2 = 3.6592$ | | | |
| | $d_2 = 1.2439$ | $n_1 = 1.51633$ | $\nu_1 = 64.15$ |
| $r_3 = 10.2654$ | | | |
| | $d_3 = D_2$ (variable) | | |
| $r_4 = \infty$ | | | |
| | $d_4 = 3.0216$ | $n_2 = 1.54869$ | $\nu_2 = 45.55$ |
| $r_5 = \infty$ | | | |
| | $d_5 = D_3$ (variable) | | |
| $r_6 = -3.4923$ | | | |
| | $d_6 = 0.3241$ | $n_3 = 1.88300$ | $\nu_3 = 40.78$ |
| $r_7 = 6.8817$ | | | |
| | $d_7 = D_4$ (variable) | | |
| $r_8 = \infty$ | | | |
| | $d_8 = 1.2156$ | $n_4 = 1.69680$ | $\nu_4 = 55.52$ |
| $r_9 = -4.6677$ | | | |
| | $d_9 = 0.0810$ | | |
| $r_{10} = 13.6167$ | | | |
| | $d_{10} = 1.2966$ | $n_5 = 1.51633$ | $\nu_5 = 64.15$ |
| $r_{11} = -12.0608$ | | | |
| | $d_{11} = 0.0810$ | | |
| $r_{12} = 4.0944$ | | | |
| | $d_{12} = 1.8233$ | $n_6 = 1.69680$ | $\nu_6 = 55.52$ |
| $r_{13} = \infty$ | | | |
| | $d_{13} = 0.5673$ | $n_7 = 1.67270$ | $\nu_7 = 32.10$ |
| $r_{14} = 3.2164$ | | | |
| | $d_{14} = 0.8509$ | | |
| $r_{15} = \infty$ | | | |
| | $d_{15} = 1.6207$ | $n_8 = 1.54869$ | $\nu_8 = 45.55$ |
| $r_{16} = \infty$ | | | |

| f | 10.0 | 12.492 | 15.967 |
|---|---|---|---|
| $D_1$ | 5.843 | 5.741 | 5.843 |
| $D_2$ | 0.405 | 0.507 | 0.405 |
| $D_3$ | 0.485 | 0.949 | 1.514 |
| $D_4$ | 1.353 | 0.889 | 0.324 |

$f_1 = 10.349$, $f_2 = -2.586$, $f_3 = 3.366$
$\beta_1/\beta_{ST} = 0.04984/0.0462 = 1.08$, $|d/f_2| = 0.40$
$f_W/f_3 = 2.97$, $\nu_2 = 40.78$, $\beta_3 = -1.22$

Embodiment 3' f = 6.441–9.956,
Object point 202.59   F/3.0,   Image height 0.77

| | | | |
|---|---|---|---|
| $r_1 = \infty$ (stop) | | | |
| | $d_1 = D_1$ (variable) | | |
| $r_2 = 3.6592$ | | | |
| | $d_2 = 1.2439$ | $n_1 = 1.51633$ | $\nu_1 = 64.15$ |
| $r_3 = 10.2654$ | | | |
| | $d_3 = D_2$ (variable) | | |
| $r_4 = \infty$ | | | |
| | $d_4 = 3.0216$ | $n_2 = 1.54869$ | $\nu_2 = 45.55$ |
| $r_5 = \infty$ | | | |
| | $d_5 = D_3$ (variable) | | |
| $r_6 = -3.4923$ | | | |
| | $d_6 = 0.3241$ | $n_3 = 1.88300$ | $\nu_3 = 40.78$ |
| $r_7 = 6.8817$ | | | |
| | $d_7 = D_4$ (variable) | | |
| $r_8 = \infty$ | | | |
| | $d_8 = 1.2156$ | $n_4 = 1.69680$ | $\nu_4 = 55.52$ |
| $r_9 = -4.0989$ | | | |
| | $d_9 = 0.0810$ | | |
| $r_{10} = 9.0555$ | | | |
| | $d_{10} = 1.2966$ | $n_5 = 1.51633$ | $\nu_5 = 64.15$ |
| $r_{11} = -16.2565$ | | | |
| | $d_{11} = 0.0810$ | | |
| $r_{12} = 3.4822$ | | | |
| | $d_{12} = 1.8233$ | $n_6 = 1.69680$ | $\nu_6 = 55.52$ |
| $r_{13} = \infty$ | | | |
| | $d_{13} = 0.5673$ | $n_7 = 1.78472$ | $\nu_7 = 25.71$ |
| $r_{14} = 3.4631$ | | | |
| | $d_{14} = 0.7253$ | | |
| $r_{15} = \infty$ | | | |

-continued f = 6.441–9.956,
Object point 202.59   F/3.0,   Image height 0.77

| | $d_{15} = 1.6207$ | $n_8 = 1.54869$ | $\nu_8 = 45.55$ |
|---|---|---|---|
| $r_{16} = \infty$ | | | |

| f | 6.441 | 7.946 | 9.956 |
|---|---|---|---|
| $D_1$ | 5.843 | 5.741 | 5.843 |
| $D_2$ | 0.405 | 0.507 | 0.405 |
| $D_3$ | 0.485 | 0.949 | 1.514 |
| $D_4$ | 1.353 | 0.889 | 0.324 |

$f_1 = 10.349$, $f_2 = -2.586$, $f_3 = 2.785$
$\beta_1/\beta_{ST} = 0.04984/0.0462 = 1.08$, $|d/f_2| = 0.37$
$f_W/f_3 = 2.31$, $\nu_2 = 40.78$, $\beta_3 = -0.81$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 2A:
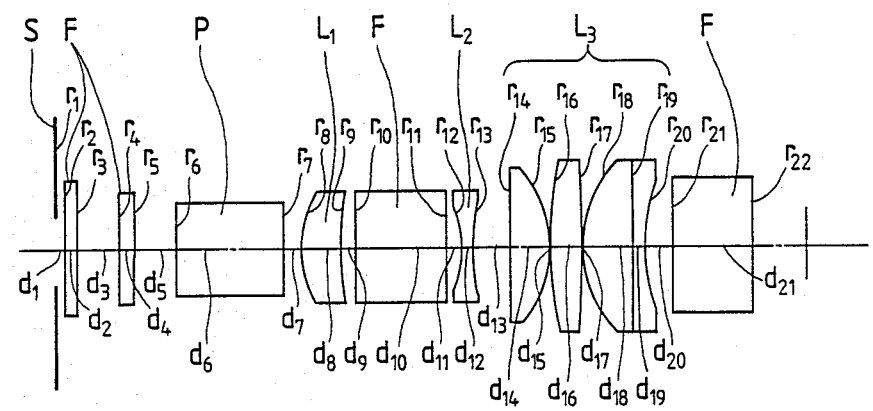
FIG. 2 shows sectional views illustrating compositions of Embodiments 1 and 2 of the imaging optical system according to the present invention.
Figure 2B:
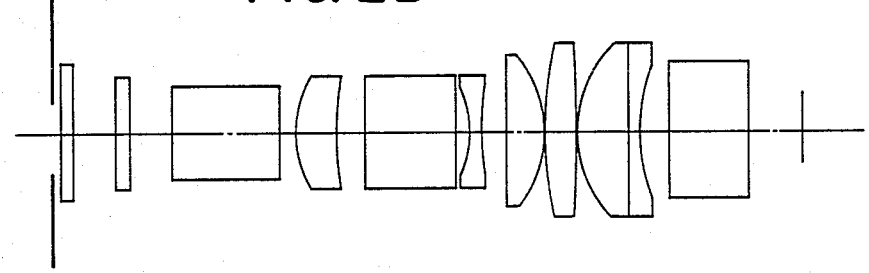
Figure 2C:
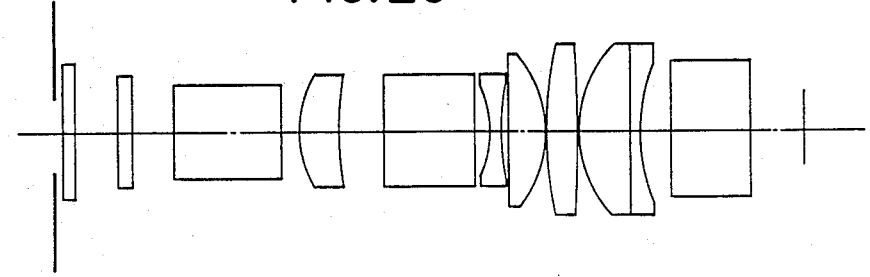
Figure 4:
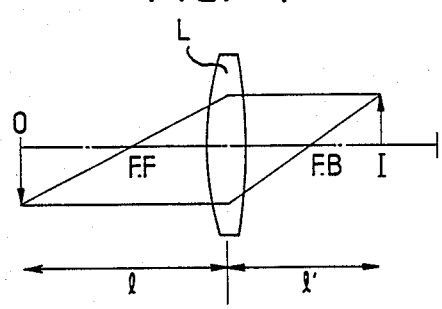
FIG. 4 shows a sectional view illustrating relationship between an object point and an image point of a lens.
Figure 5:
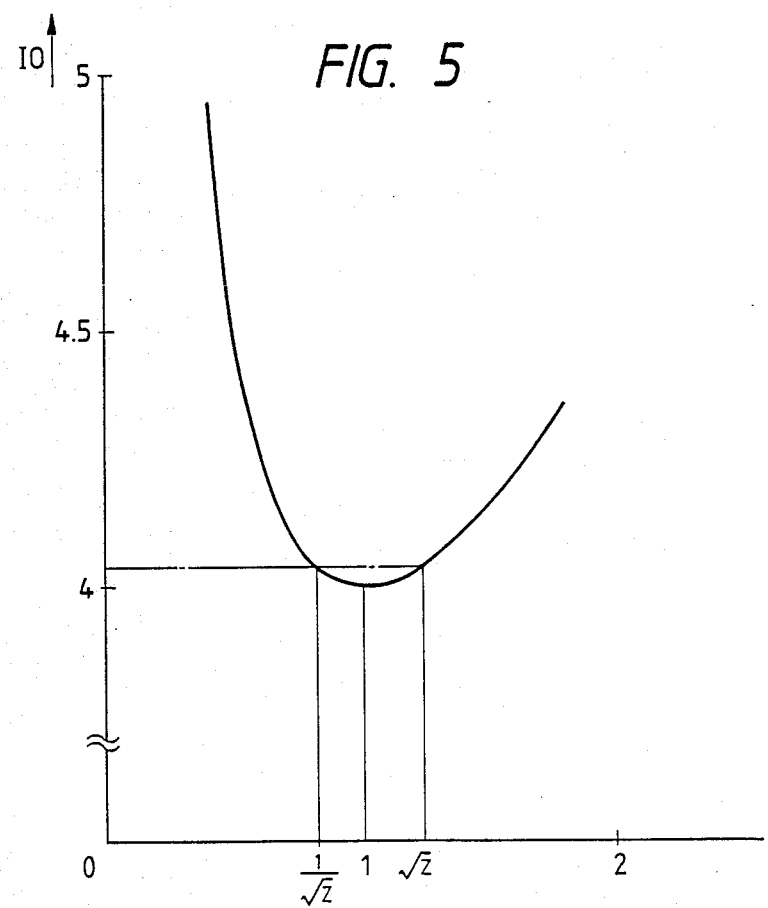
FIG. 5 shows a graph illustrating relationship of magnification versus distance between an object point and an image point.
Figure 6A:
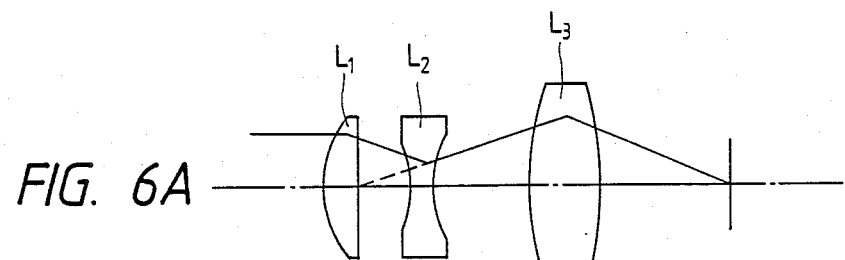
FIG. 6A through FIG. 6D show sectional views illustrating modifications of an optical system in accordance with image sizes on an image pick-up device.
Figure 6B:
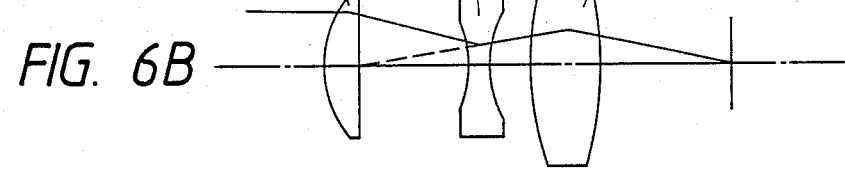
Figure 6C:
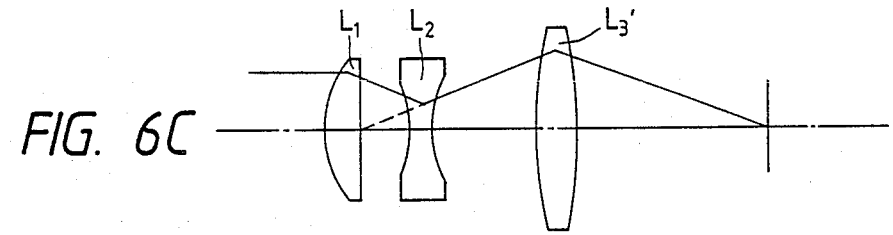
Figure 6D:
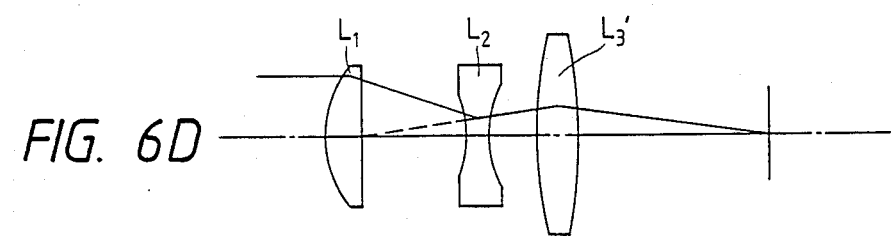
Figure 7:
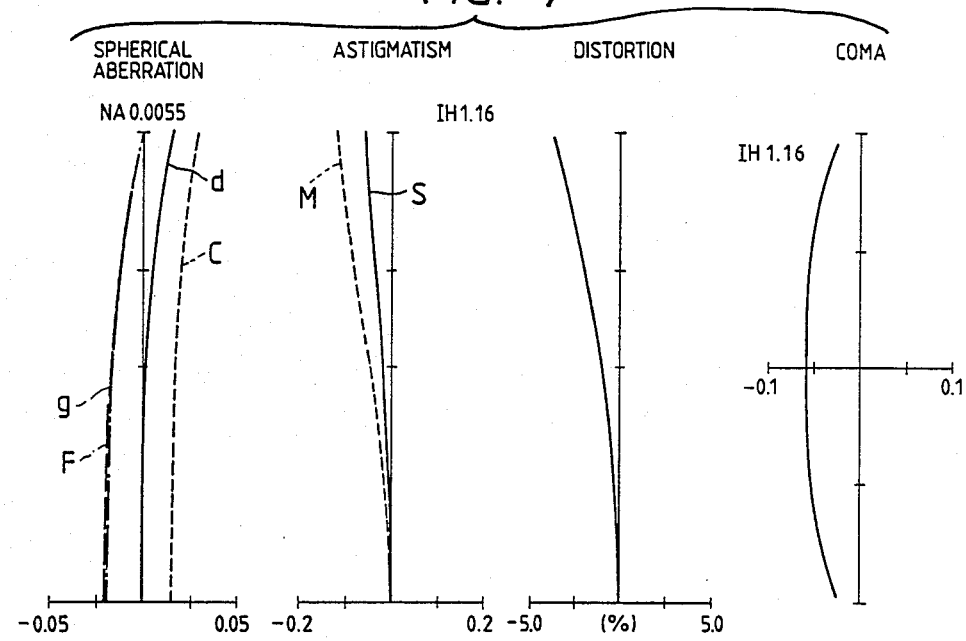
Figure 8:
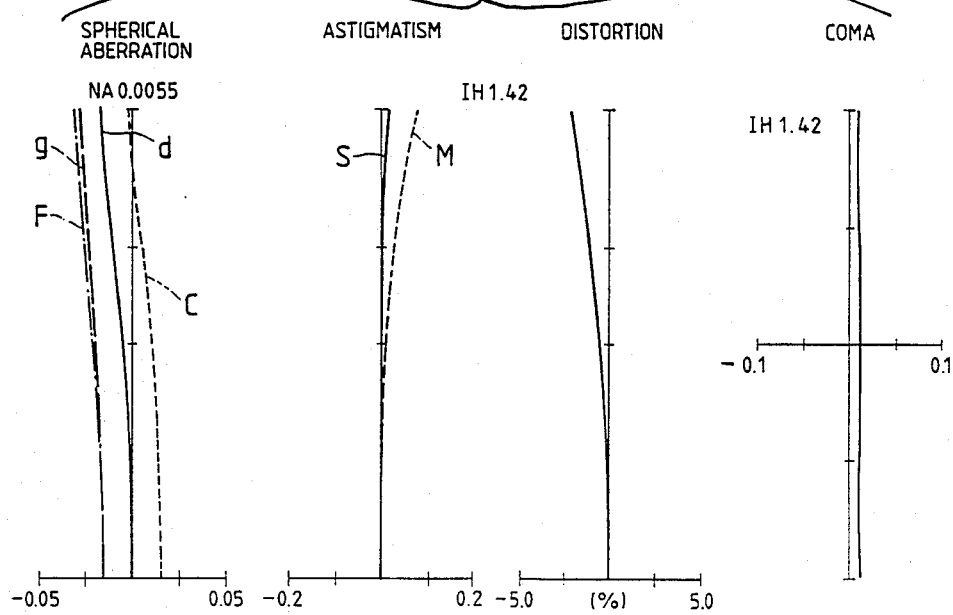
Figure 11:
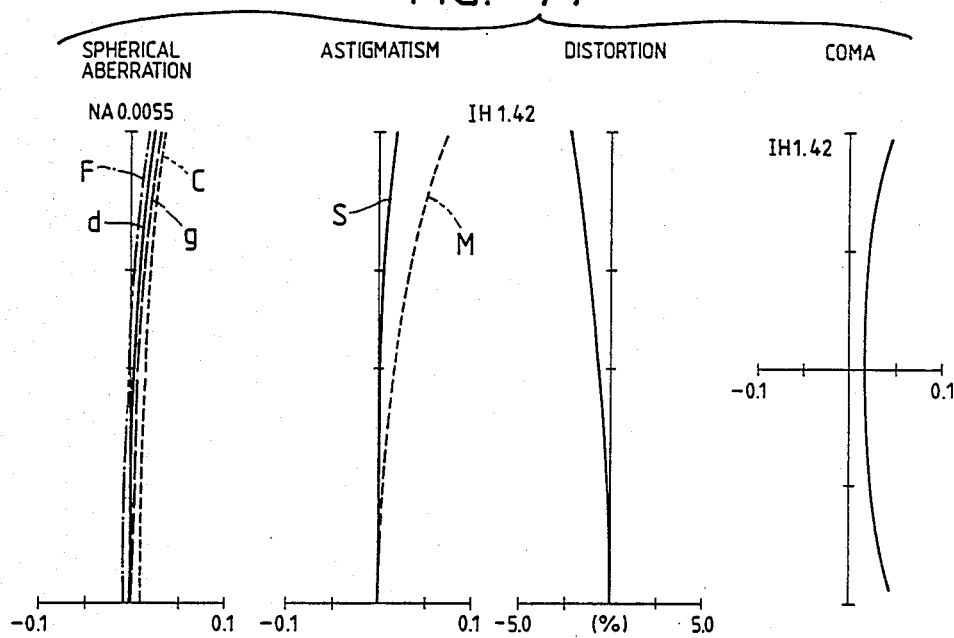
Figure 12:
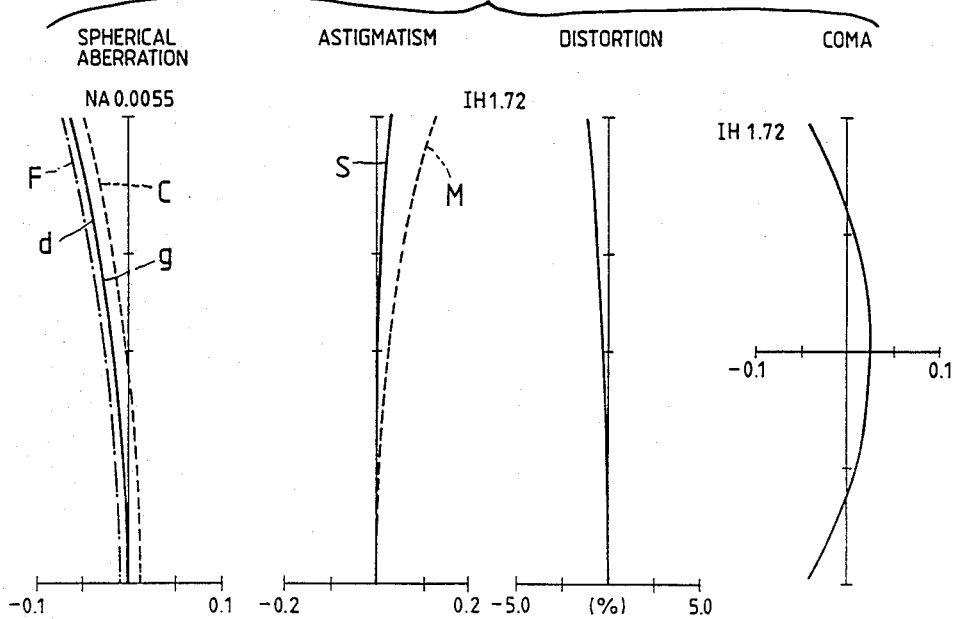

Each of the Embodiment 1 and the Embodiment 2 has the composition shown in FIG. 2. Speaking concretely, the first lens unit (compensator) $L_1$ consists of a single positive lens component, the second lens unit (variator) $L_2$ consists of a single negative lens component, and the third lens unit (imaging lens unit) $L_3$ consists of a positive lens component, a positive lens component and a cemented doublet. In FIG. 2, the reference symbol P represents a prism and the reference symbols F designate filters. Aberration characteristics of the Embodiment 1 at the wide position, intermediate focal length and tele position thereof are illustrated in FIG. 7, FIG. 8 and FIG. 9 respectively. Aberration characteristics of the Embodiment 2 at the wide position, intermediate focal length and tele position thereof are visualized in FIG. 10, FIG. 11 and FIG. 12 respectively.

Figure 3:
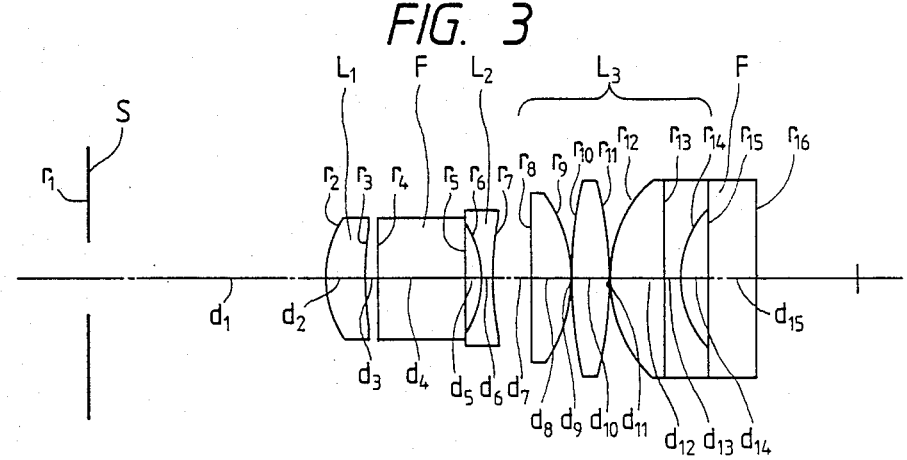
FIG. 3 shows a sectional view illustrating composition of Embodiment 3 of the imaging optical system according to the present invention.
Figure 13:
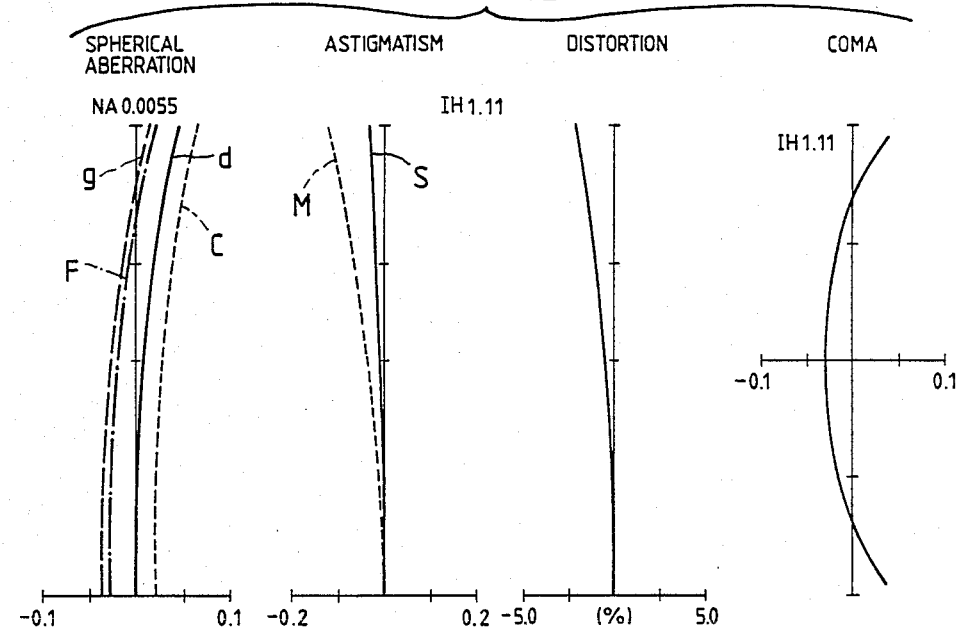
FIG. 13 through FIG. 15 show curves illustrating aberration characteristics of the Embodiment 3 of the present invention.
Figure 14:
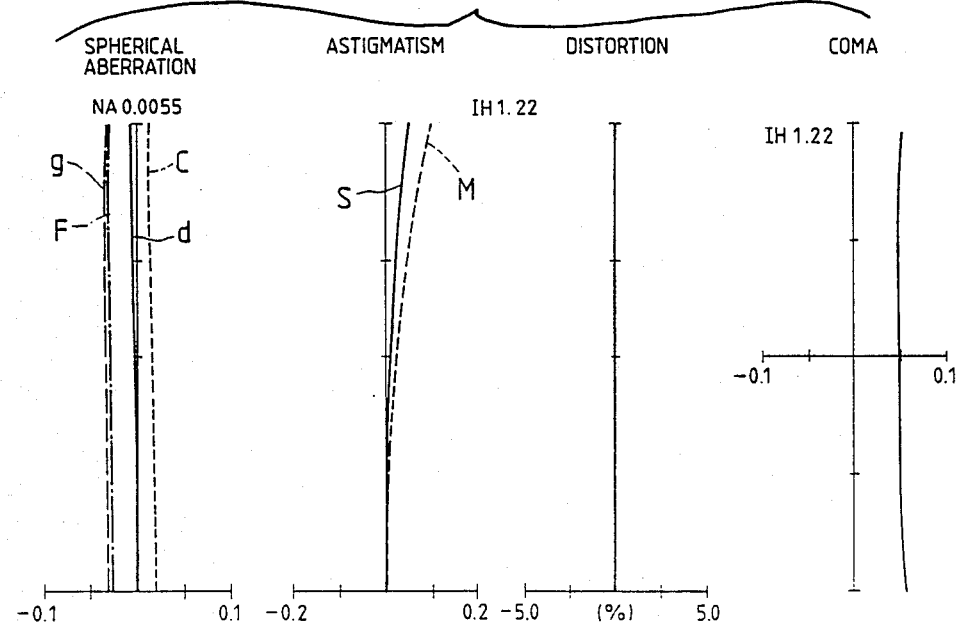
Figure 15:
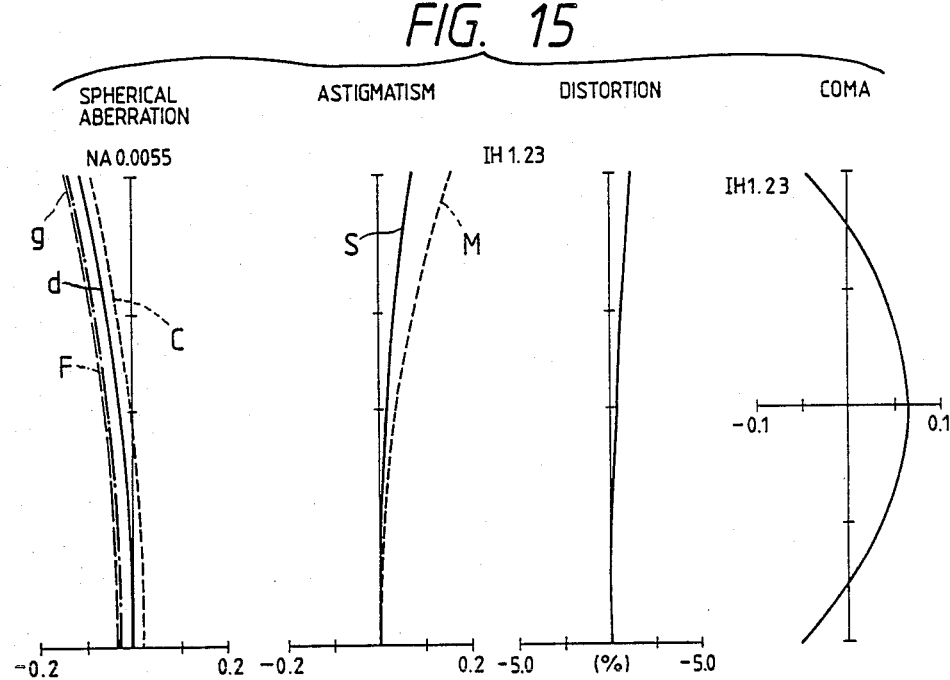
Figure 16:
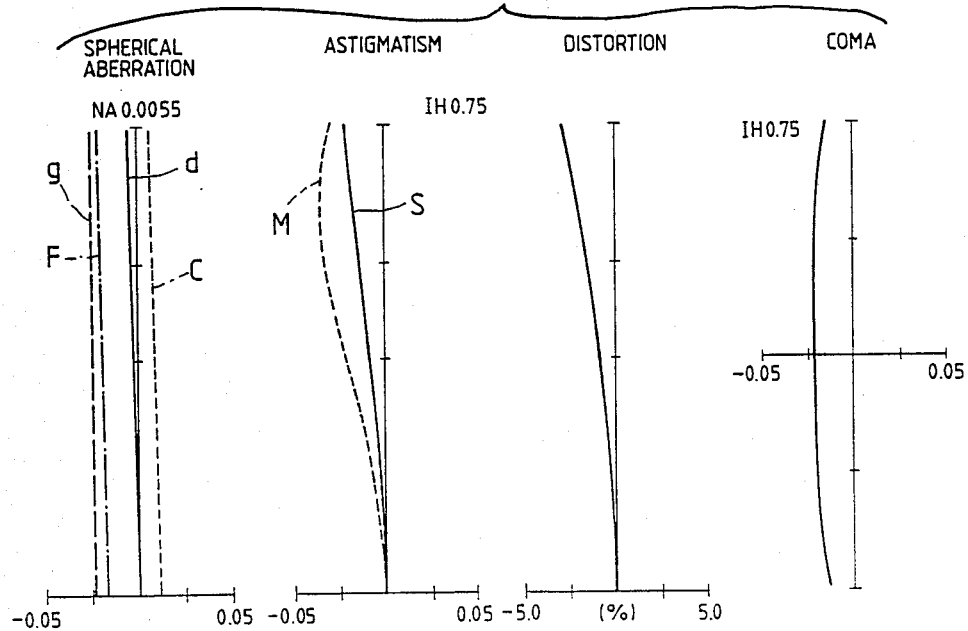
FIG. 16 through FIG. 18 show graphs illustrating aberration characteristics of the Embodiment 3' of the present invention.
Figure 17:
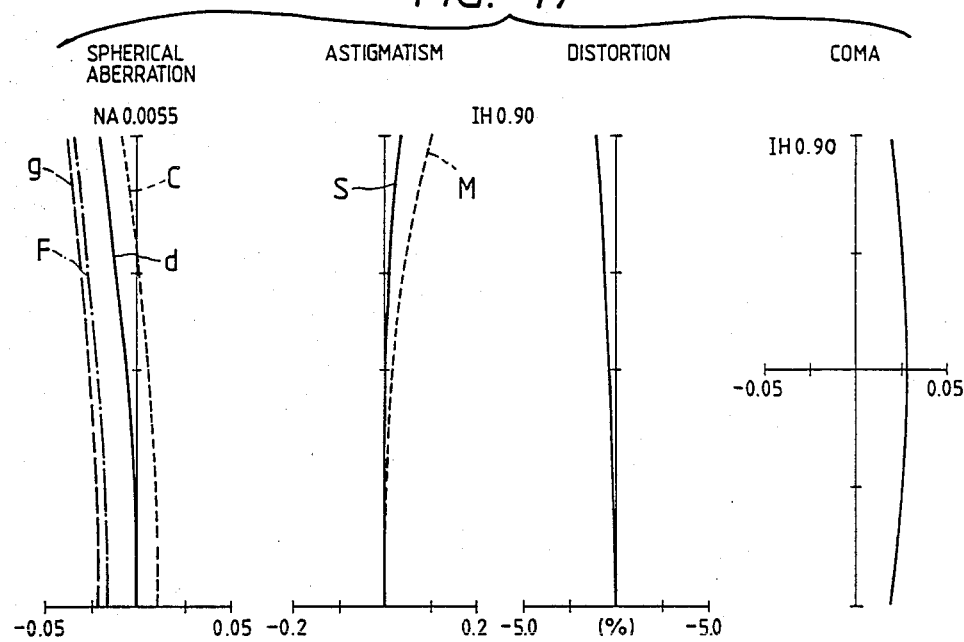
Figure 18:
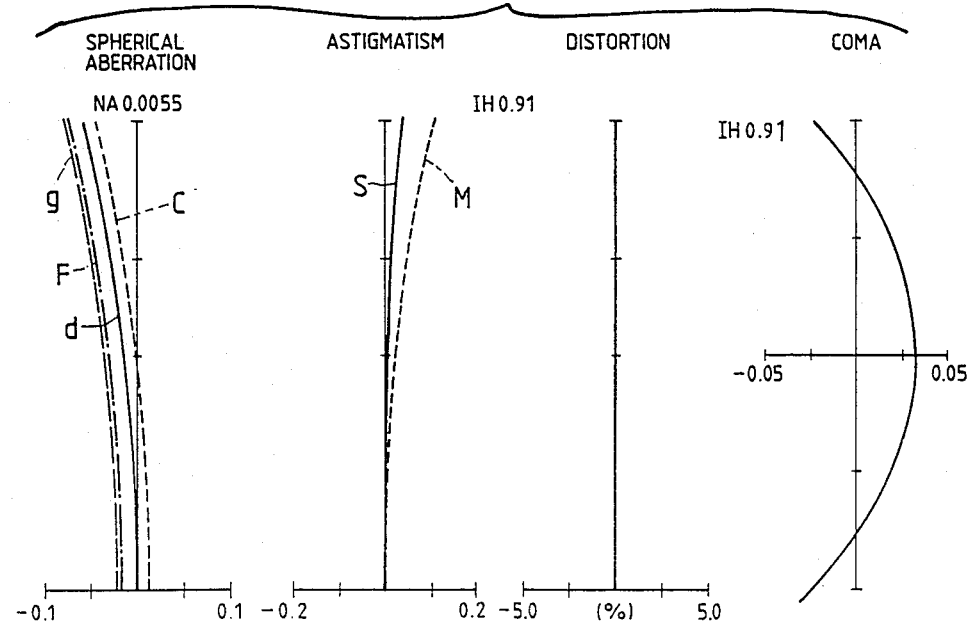

The Embodiment 3 is a lens system having the composition shown in FIG. 3. The Embodiment 3' is the lens system of the Embodiment 3 wherein the third lens unit $L_3$ is replaced with another lens unit having a different magnification. Speaking more concretely, the third lens unit for the image pick-up device having an image size of ½ inch used in the Embodiment 3 is replaced with another lens unit for an image pick-up device having an image size of ½ inch in the Embodiment 3'. Aberration characteristics of the Embodiment 3 at the wide position, intermediate focal length and tele position thereof are illustrated in FIG. 13, FIG. 14 and FIG. 15 respectively. Aberration characteristics of the Embodiment 3' at the wide position, intermediate focal length and tele position thereof are visualized in FIG. 16, FIG. 17 and FIG. 18 respectively.

The imaging optical system according to the present invention is a zoom lens system comprising a stop arranged before the lens system, and is capable of providing images at an optimum magnification and brightness when combined with various types of fiberscope, non-flexible endoscopes, etc. Further, the imaging optical system according to the present invention is capable of uniformalizing sizes of images and magnification ranges on a monitor when combined with image pick-up devices having various image sizes. In addition, the imaging optical system according to the present invention has a fixed magnification regardless of zooming performed on the side of the viewfinder and other merits.

I claim:

1. An imaging optical system comprising a first lens unit having positive refractive power and the function of a compensator, a second lens unit having negative refractive power and the function of a variator, a third lens unit having positive refractive power and the function of an imaging lens, and a stop arranged before the first lens unit, said imaging optical system being so designed as to satisfy the following conditions (1), (2) and (3):

(1) $1.4 > \beta_1/\beta_{ST} > 0.71$
(2) $f_W \leq f_1 \leq f_T$
(3) $2 < f_W/f_3 < 3.2$ wherein the reference symbol $f_1$ represents focal length of the first lens unit, the reference symbol $f_3$ designates focal length of the third lens unit, the reference symbol $f_W$ denotes focal length of the optical system as a whole at the wide position thereof, the reference symbol $f_T$ represents focal length of the optical system as a whole at the tele position thereof, the reference symbol $\beta_1$ designates magnification of the first lens unit, and the reference symbol $\beta_{ST}$ denotes magnification of the optical system as a whole at an intermediate focal length thereof.

2. An imaging optical system according to claim 1 satisfying the following condition (4) and (5):

(4) $|d/f_2| < 0.45$
(5) $\nu_2 > 40$ wherein the reference symbol $f_2$ represents focal length of the second lens unit, the reference symbol d designates shifting distance of the second lens unit and the reference symbol $\nu_2$ denotes Abbe's number of a negative lens component arranged in the second lens unit.

3. An imaging optical system according to claim 2 wherein magnification of said second lens unit is variable.

4. An imaging optical system according to claim 3 wherein magnification $\beta_3$ of said third lens unit satisfies the following condition (6):

(6) $1.4 < |\beta_3| < 0.71$

* * * * *